United States Patent
Cava

(10) Patent No.: US 7,962,463 B2
(45) Date of Patent: Jun. 14, 2011

(54) AUTOMATED GENERATION, PERFORMANCE MONITORING, AND EVOLUTION OF KEYWORDS IN A PAID LISTING CAMPAIGN

(75) Inventor: William Cava, New Boston, NH (US)

(73) Assignee: Lycos, Inc., Waltham, MA (US)

( * ) Notice: Subject to any disclaimer, the term of this patent is extended or adjusted under 35 U.S.C. 154(b) by 263 days.

(21) Appl. No.: 11/371,209

(22) Filed: Mar. 8, 2006

(65) Prior Publication Data

US 2007/0100803 A1    May 3, 2007

Related U.S. Application Data

(60) Provisional application No. 60/732,011, filed on Oct. 31, 2005.

(51) Int. Cl.
G06F 7/00 (2006.01)
G06F 17/30 (2006.01)

(52) U.S. Cl. ...................................................... 707/706
(58) Field of Classification Search ........................ None
See application file for complete search history.

(56) References Cited

U.S. PATENT DOCUMENTS

| | | | |
|---|---|---|---|
| 6,286,005 B1 | 9/2001 | Cannon | 707/100 |
| 6,654,725 B1 | 11/2003 | Langheinrich et al. | 705/14 |
| 6,691,108 B2 * | 2/2004 | Li | 707/3 |
| 6,983,272 B2 | 1/2006 | Davis et al. | 707/3 |
| 7,043,450 B2 | 5/2006 | Velez et al. | 705/37 |
| 7,047,242 B1 | 5/2006 | Ponte | 707/10 |
| 7,062,510 B1 | 6/2006 | Eldering | 707/104.1 |
| 7,076,443 B1 | 7/2006 | Emens et al. | 705/14 |
| 7,076,479 B1 * | 7/2006 | Cheung et al. | 707/3 |
| 7,346,615 B2 * | 3/2008 | Bem | 707/5 |
| 2005/0137939 A1 * | 6/2005 | Calabria et al. | 705/26 |
| 2005/0149396 A1 | 7/2005 | Horowitz et al. | 705/14 |
| 2005/0228797 A1 * | 10/2005 | Koningstein et al. | 707/100 |
| 2006/0047703 A1 | 3/2006 | Strober et al. | 707/104.1 |
| 2006/0149625 A1 * | 7/2006 | Koningstein | 705/14 |
| 2006/0248035 A1 * | 11/2006 | Gendler et al. | 707/1 |

* cited by examiner

*Primary Examiner* — Kuen S Lu
*Assistant Examiner* — Rachel J Lee
(74) *Attorney, Agent, or Firm* — Fish & Richardson P.C.

(57) ABSTRACT

Keyword candidates are identified by in response to receiving an identification of a web page. Content of the web page is analyzed to identify terms from the web page. An automated keyword expansion is performed using the identified terms to produce a set of candidate keywords. Keyword suggestions are generated for the web page using the set of candidate keywords, and one or more of the keyword suggestions are used in a paid listing campaign. A performance of a paid listing campaign is compared with a performance threshold. An automated keyword expansion is performed using one or more keywords from the set of keywords to produce a set of alternative keywords in response to the comparison. One or more alternative keywords are selected from the set of alternative keywords for use in the paid listing campaign.

20 Claims, 4 Drawing Sheets

AUTOMATED GENERATION, PERFORMANCE MONITORING, AND EVOLUTION OF KEYWORDS IN A PAID LISTING CAMPAIGN

CLAIM OF PRIORITY

This application claims priority under 35 USC §119(e) to U.S. Provisional Patent Application Ser. No. 60/732,011, filed on Oct. 31, 2005, the entire contents of which are hereby incorporated by reference.

TECHNICAL FIELD

This description relates to enhancing search engine capabilities, and more particularly to automatically generating, performance monitoring, and evolving keywords in a paid listing campaign.

BACKGROUND

Typical Internet search engine websites, such as provided by Lycos, Inc., enable users to conveniently locate websites relating to a particular topic without having to know a uniform resource locator (URL) for the website. In particular, a user enters search terms as a query to a search engine and receives a list of results, typically in the form of hyperlinks to each identified website along with a title, description, and/or an excerpt of the website. Search engine websites generally use proprietary algorithms for performing automated searching and/or indexing of documents available over the Internet. The purpose of such algorithms is generally to locate web documents that are relevant in the context of a particular query based on the content of the web documents. Accordingly, results can be ranked and presented to the user in an order of relevance, as determined by the particular proprietary algorithm.

Many Internet search engines also provide predetermined results based on the search terms included in the query and without explicitly considering the content of the web documents included in the results. For example, the results of a search may include sponsored links or other paid listings that are based on an inclusion in the search of a particular keyword or keywords. Typically, an advertiser bids or pays a preset fee to be displayed as a sponsored link for searches that include a particular keyword or keywords. In many cases, advertisers bid based on a pay-per-click model, in which the advertiser only pays when its link in a search results list is clicked.

The efficiency of a paid listing for a website is dependent upon the selection of one or more keywords that are most likely to be used by consumers to which the website is targeted. For example, a website operator may want its website to appear as a paid listing in response to search queries submitted by consumers who are actually searching for the content of the website or some closely related content. Keywords can be selected by identifying a small number of highly relevant search terms and using a keyword expansion technique. Conventional keyword expansions are lexicographical and use thesauruses, dictionaries, and other linguistic resources to identify alternative search terms with the same or similar meanings.

SUMMARY

Keyword expansions are performed to produce keywords for use in a paid listing campaign. The keyword expansion can be performed based on data extracted from a website to be promoted. The keyword expansion can also be performed on keywords that are performing well for use in replacing keywords that are performing poorly.

In one general aspect, keyword candidates are identified in response to receiving an identification of a web page. Content of the web page is analyzed to identify terms from the web page. An automated keyword expansion is performed using the identified terms to produce a set of candidate keywords. Keyword suggestions are generated for the web page using the set of candidate keywords.

Implementations can include one or more of the following features. The web page is identified based on a unique address associated with the web page. The content of the web page is analyzed by extracting terms from the web page. Keyword suggestions for the web page are generated by calculating a relevance score for keywords from the set of candidate keywords. The relevance score for each keyword is based on usage data associated with the keyword. The usage data relates to a cost associated with the keyword or a click rate associated with the keyword. An automated evaluation of a promotional campaign associated with the web page that uses the keyword suggestions is performed. One or more alternative keyword suggestions are generated based on the automated evaluation.

In another general aspect, keyword candidates are identified by comparing a performance threshold with a performance of a paid listing campaign having a corresponding set of keywords used to select a listing, performing an automated keyword expansion using one or more keywords from the set of keywords to produce a set of alternative keywords in response to the comparison, and selecting one or more alternative keywords from the set of alternative keywords for use in the paid listing campaign.

Implementations can include one or more of the following features. The performance threshold relates to a click rate associated with the paid listing campaign, a conversion rate associated with the paid listing campaign, a ratio between the click rate and a cost for the paid listing campaign, or a ratio between the conversion rate and a cost for the paid listing campaign. The paid listing campaign is associated with the set of keywords in accordance with a pay-per-click model. A performance of each keyword from the set of keywords is evaluated. A first keyword having a relatively favorable performance is identified, and the automated keyword expansion is performed using the first keyword. A second keyword having a relatively unfavorable performance is identified, and the second keyword is removed from use in the paid listing campaign. One or more alternative keywords are used in the paid listing campaign. A relevance score for alternative keywords from the set of alternative keywords is calculated. The one or more selected alternative keywords are selected, at least in part, using the relevance score.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

In general, keyword expansions involve selecting an initial keyword or keywords and identifying one or more other related or potentially related keywords. Keywords can include terms that are used to index data and terms that are used as criteria for a search. Among other things, keywords can include meta tags included in web pages and terms that are used to search for the meta tags. A meta tag is a tag (i.e., a coding statement) in the Hypertext Markup Language (HTML) that describes some aspect of the contents of a Web page. A keyword can be a single word, a character string, or a phrase. Typical keyword expansions are performed on manually selected keywords. In other words, a pay-per-click advertiser identifies one or more keywords to use in a campaign, and in some cases, such keywords are entered into a keyword expansion tool to identify additional possible keywords.

Candidate keywords can be selected with greater reliability and convenience using automated selection techniques in which keywords are selected based on an automated analysis of the content of a website and/or web page. In addition, campaign performance can be monitored and iteratively improved by evaluating performance using an objective function. In both cases, new keywords can be selected using keyword expansion techniques.

Keyword expansion/keyword suggestion techniques can include, for example, conventional keyword expansions that use lexicographical techniques, manually constructed databases, and/or conceptual keyword expansions that identify keywords that relate to the same underlying concept without being limited to lexicographical tools such as thesauruses and dictionaries, as described in related application U.S. Ser. No. 11/371,211 entitled "Automatic Identification of Related Search Keywords," filed Mar. 8, 2006. Here a concept is a general idea derived or inferred from specific instances or occurrences.

Figure 1:
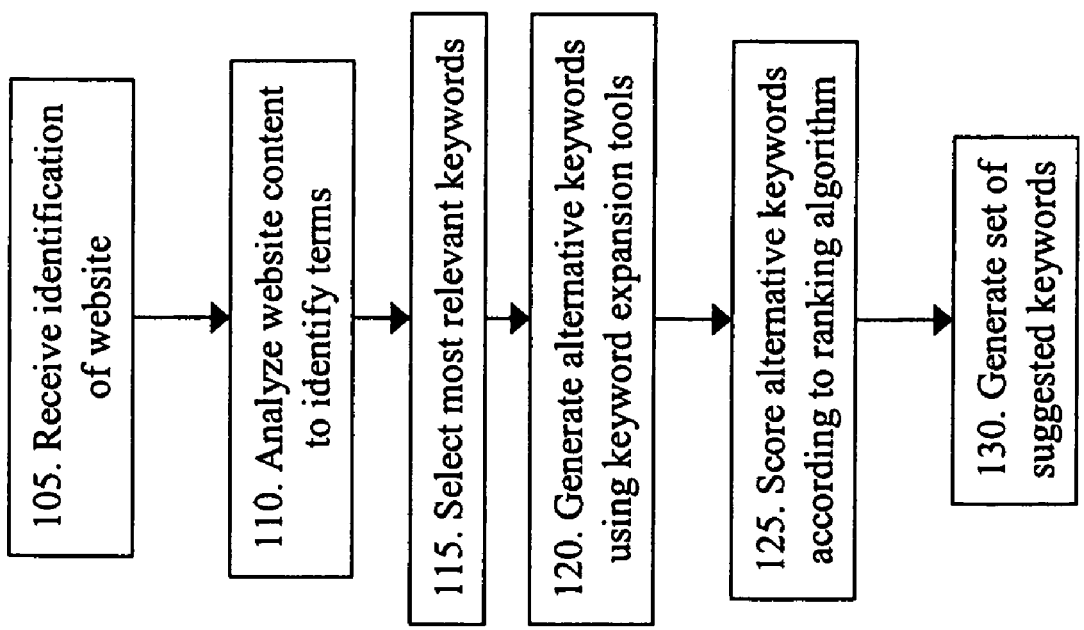
FIG. 1 is a flow diagram of a process for identifying keywords for use in a paid listing campaign.

FIG. 1 is a flow diagram of a process 100 for identifying keywords for use in a paid listing campaign, such as may be implemented in accordance with a pay-per-click model. An identification of a website or web page is received (105). The identification can be in the form of a uniform resource locator (URL) or other unique address. The content of the website or web page is analyzed (110) to identify relevant terms. In some implementations, relevant terms are identified on an individual web page basis, while in other implementations relevant terms are identified for an overall a website. Relevant terms are identified by extracting keywords from the website or web page. Keywords can be extracted by identifying terms that appear on each web page. Keywords can be extracted from meta tags, such as keyword meta tags or description meta tags, web page titles, headings, and/or web page content. The extraction of keywords can include disregarding certain terms, such as common words, hidden text, and/or content that otherwise shows signs of being potentially unreliable in that it is not indicative of the actual subject matter of the web page.

The extracted keywords can be further analyzed to potentially reduce the number of keywords (115). For example, a subset of the extracted keywords that represent the core set of concepts for the website or web page can be selected. In some cases, however, such as when only a few keywords are extracted, it may be unnecessary to reduce the number of keywords. The extracted keywords can be analyzed to identify those keywords that are likely to produce favorable results, according to an evaluation algorithm. The evaluation algorithm can implement any type of selection criteria designed to select favorable keywords. For example, the evaluation algorithm can operate to select keywords that are most relevant to the web page or website based on an analysis of, e.g., keyword placement and frequency of appearance; to select keywords that are relatively unique, based on empirical keyword usage statistics; to select keywords that are relatively orthogonal to one another (e.g., that correspond to different search strategies and are unlikely to be used in the same search query or search session, so as to increase the overall number of hits) based on statistical usage data; and/or based on data regarding usage statistics.

Each of the keywords in the remaining set of keywords is used as an input for a keyword expansion tool, and the keyword expansion tool generates (120) alternative keywords. In some implementations, the remaining set of keywords and the alternative keywords are then scored according to a ranking algorithm (125). The ranking algorithm generates a "confidence score" based on empirical click rate data and cost-per-click data. The click rate data indicates a frequency at which a user clicks on links that are included in a results list generated based on search queries that include the particular keyword, while the cost-per-click data defines a cost in a pay-per-click advertising model. Other ranking algorithms are possible, such as one that generates a confidence score based on historical usage rates of the keyword in search queries or that weights a relevance of each keyword determined based on, e.g., how closely the keyword correlates with the extracted keywords.

A set of suggested keywords is generated (130). The keywords that are suggested can be based on the confidence score for each possible keyword and/or an evaluation algorithm as described above. In some cases, the suggested keywords may include all of the keywords produced by the keyword expansion tool. One or more of the suggested keywords can then be used in a paid listing campaign. A paid listing campaign is an Internet advertising strategy in which listings (e.g., sponsored links) are provided in response to the inclusion of one or more particular keywords in a search. Generally, an owner of a website identified in a listing pays a fee for the listing. Paid listings can also include banner ads and pop-up ads that are based on the use of one or more particular keywords. For example, when a user enters a search query that includes one of the suggested keywords, the website or web page that corresponds to the suggested keywords can be listed as a sponsored link. When a user selects (i.e., clicks) the link, the owner of the website or web page is charged a pay-per-click rate.

Figure 2:
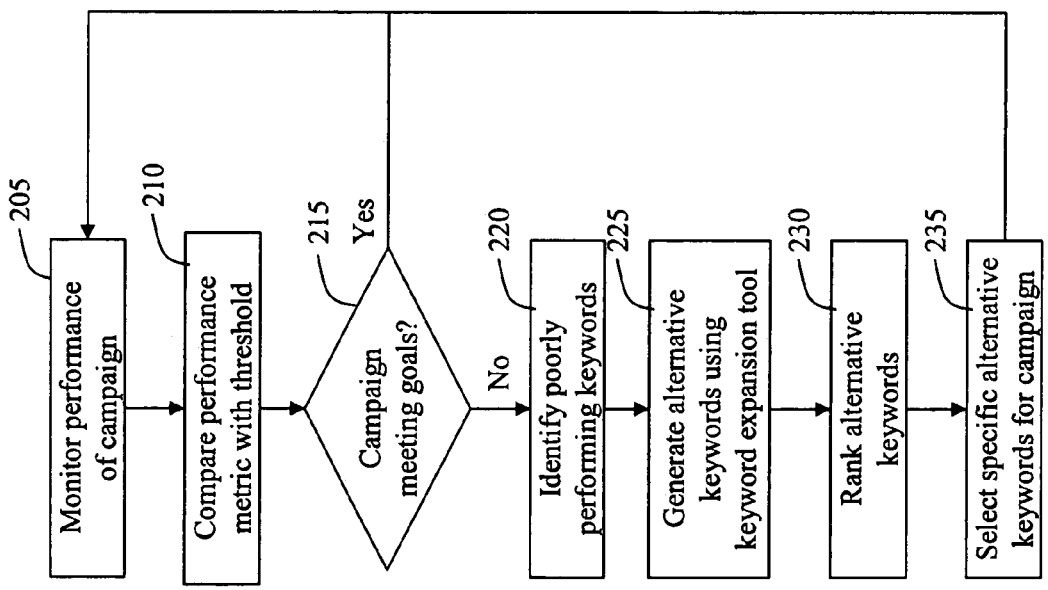
FIG. 2 is a flow diagram of a process for continuously improving a paid listing campaign through an evolving set of keywords.

FIG. 2 is a flow diagram of a process 200 for continuously improving a paid listing campaign through an evolving set of keywords. After a paid listing campaign is initiated for a web page or website, such as by using the techniques described in connection with FIG. 1, a performance metric for the campaign is monitored (205). The performance metric generally monitors the level of traffic and/or sales produced by the campaign. The performance metric can include tracking a click rate (e.g., a number of times users click on a link to a website or web page listed in a paid listing campaign), a conversion rate (e.g., a number of actual sales or other ultimate goals of the website or web page attained as a result of the paid listing campaign), which keyword or keywords were used in each search query that resulted in a click-through, and/or a calculated return on investment for the campaign (e.g., a ratio of a click rate, conversion rate, or some combination thereof to a cost-per-click). The performance metric can be updated in real time or on a periodic basis.

A periodic comparison (e.g., every twenty four hours or once a month) is made between each of one or more performance metrics and a corresponding performance threshold (210). The performance threshold can be, for example, a minimum expected click rate, conversion rate, or return on investment. The performance threshold can also be relative in that it compares a performance metric for one or more keywords with a performance metric for one or more other keywords (e.g., to identify keywords that are performing relatively poorly and or relatively well). The performance threshold can be established using goals supplied by an advertiser (e.g., an owner of the website or web page) or by using historical performance metrics.

A determination (215) is made as to whether the campaign is performing in accordance with goals. If so, the process 200 returns to monitoring (205) for another iteration of monitoring and performing (210) a periodic comparison. By using an iterative process, a determination can be made as to whether the campaign declines and/or improves over time. In some cases, the performance metrics can be cumulative (i.e., such that trends can be identified based on slight changes in the performance metric over time) or can be separated for each monitoring period (i.e., to enable performance comparisons between any number of different periods).

If the campaign is not performing in accordance with goals, the performance metrics can be used to identify one or more keywords that are performing poorly and/or well relative to the performance threshold (e.g., relative to a predefined level or to other keywords) (220). In some cases, even if the campaign is performing in accordance with goals, performance metrics can be used to identify poorly performing keywords in an effort to further improve performance. A keyword expansion tool can be used to perform a keyword expansion on certain keywords to produce a list of alternative keywords for use in the paid listing campaign (225). In some implementations, the keyword expansion is applied to keywords that are performing well under the assumption (or in accordance with experience) that expanding keywords that are performing well will produce other keywords that are likely to perform well. In other implementations, the keyword expansion is applied to keywords that are performing poorly in an effort to find keywords that represent similar concepts but that will produce better results. In some implementations, keyword expansion can be applied to both keywords that are performing well and others that are performing poorly.

The alternative keywords can be evaluated or ranked using ranking and/or evaluation algorithms as described above (230). One or more of the alternative keywords can be selected for use in the paid listing campaign (235). The alternative keywords that are selected can be based on a confidence score produced by the ranking and/or evaluation algorithms and/or can take into consideration stored data regarding past performance. For example, a particular alternative keyword might have a relatively high confidence score but might have been used unsuccessfully in a prior iteration. The alternative keyword or keywords that are selected can be added to the existing keywords for the campaign or can be substituted for a current keyword or keywords, especially for a keyword or keywords that are performing poorly. The process 200 returns to 205 for another iteration. Thus, keywords can be updated as often as each periodic comparison (at 210). In this manner, the campaign can continuously evolve to attempt to produce improved results and/or to follow trends in keyword usage.

Figure 3:
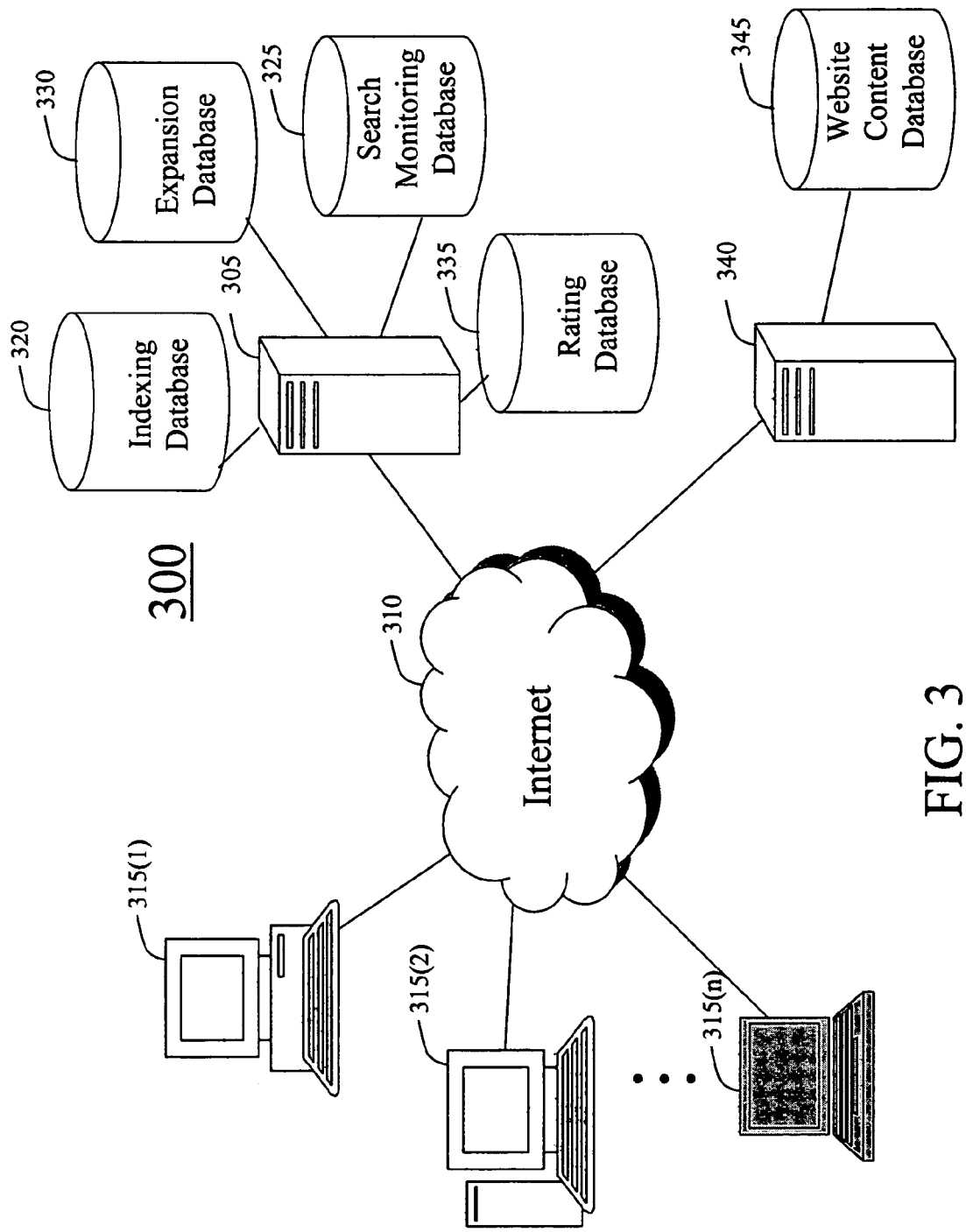
FIG. 3 is a block diagram of an exemplary system that can be used to automatically select and periodically adjust keywords in a paid listing campaign.

FIG. 3 is a block diagram of a system 300 that can be used to automatically select and periodically adjust keywords in a paid listing campaign. A search engine is implemented on a search engine server 305 that receives search queries sent through a network 310, such as the Internet, from a user device 315. A search engine can include computer software used to search data (e.g., files, documents, or websites) as text or in a database for specified information and/or that meets specific criteria. The search can be performed on a network, such as a private network or the Internet, or on a single device. Search engines can use a regularly updated (e.g., using spider software) index of data to look for entries that match search criteria entered by a user or can perform a search of potential target data in response to a search query.

The search engine server 305 generates results for search queries based on indexing data stored in an index database 320. For example, the index database 320 stores an index of websites by keyword, and the search engine server 305 determines which websites are the most relevant by comparing terms in a particular search query with the index. The results generally include a list of websites that correspond to the search query and that are sequenced according to a relative relevance of each website. Some of the results reflect paid listings (e.g., sponsored links) that are selected based on the use of corresponding keywords in the search queries. The results are sent over the network 310 to the user device 315 from which the search query was received for presentation on a user interface. A user at the user device 315 can then select websites from the results list.

The search engine server 305 stores data relating to the received search queries in a search monitoring database 325. The search monitoring database 325 can store information such as the search terms or keywords included in each search query, a date and time at which each search term is received, and which of the results for each search query are selected by a user from the results list. The search monitoring database 325 can store information for individual search queries or search sessions.

To automatically select web page keywords for use in a paid listing for a web page, the search engine server 305 accesses a website server 340 that hosts the web page to extract content of the web page, which is stored in a website content database 345. The search engine server 305 analyzes the content of the web page to identify keywords from the web page. The search engine server 305 uses the identified keywords to perform an automated keyword expansion using data from an expansion database 330. The search engine server 305 generates keyword suggestions from the results of the automated keyword expansion. The keyword suggestions can be generated based, at least in part, using historical search information from the search monitoring database 325 and/or scoring data from a rating database 335.

As numerous search queries are received from a large number of different user devices 315 during conduct of a paid listing campaign using the keyword suggestions, performance data for the paid listing campaign is stored in the search monitoring database 325. The search engine server 305 periodically compares the performance data with a performance threshold to determine whether the suggested keywords are performing well or poorly. The search engine server 305 uses keywords that are performing well to perform an automated keyword expansion using data from the expansion database 330. The search engine server 305 generates alternative keyword suggestions from the results of the automated keyword expansion. The keyword suggestions can be generated based, at least in part, using historical search information from the search monitoring database 325 and/or scoring data from the rating database 335. The suggested keywords can be used to replace keywords that are performing poorly.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in a machine readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 4:
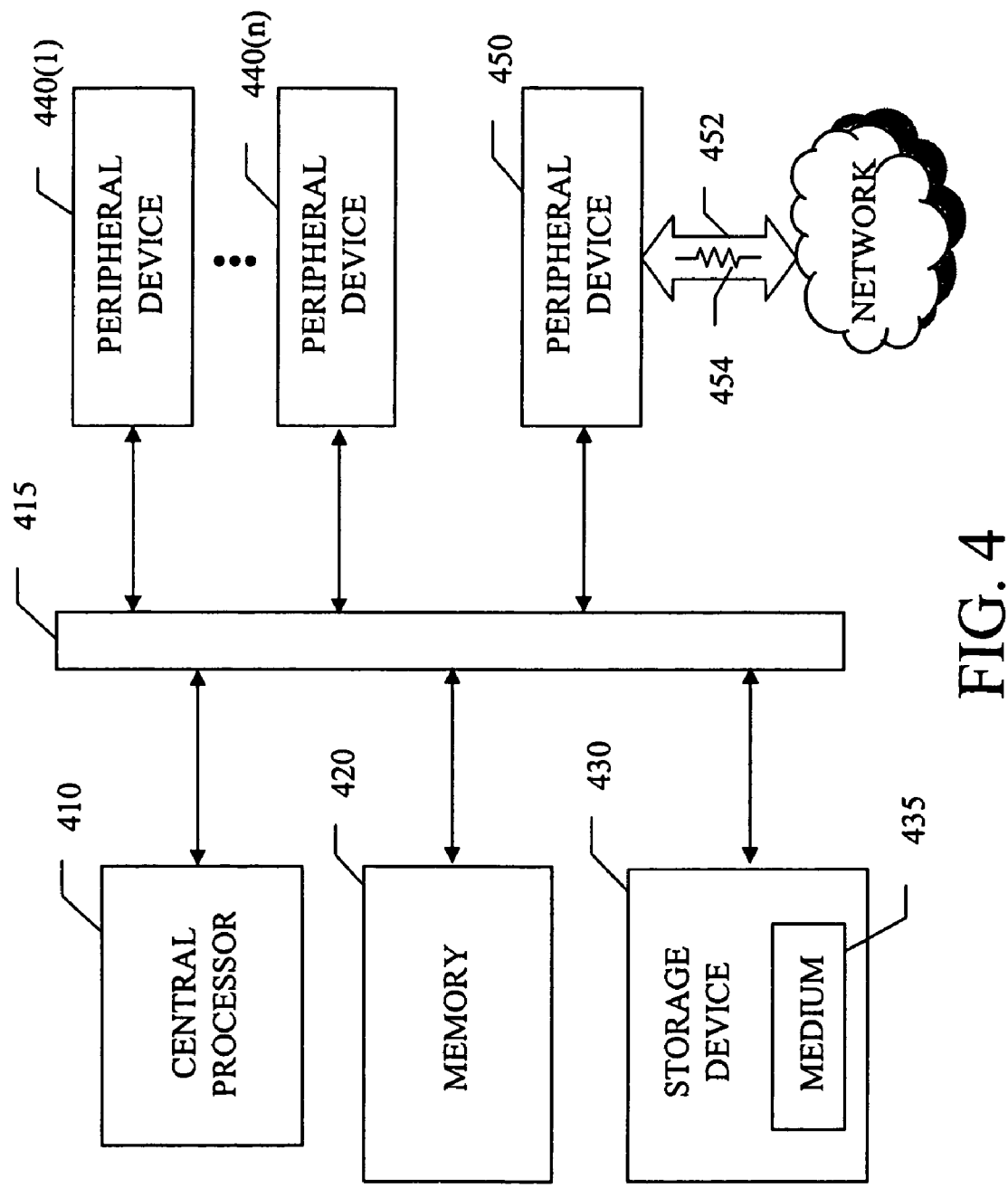
FIG. 4 is a block diagram illustrating an example data processing system in which the described systems and techniques can be implemented.

FIG. 4 is a block diagram illustrating an example data processing system 400 in which the systems and techniques described above can be implemented. The data processing system 400 includes a central processor 410, which executes programs, performs data manipulations, and controls tasks in the system 400. The central processor 410 is coupled with a bus 415 that can include multiple busses, which may be parallel and/or serial busses.

The data processing system 400 includes a memory 420, which can be volatile and/or non-volatile memory, and is coupled with the communications bus 415. The system 400 can also include one or more cache memories. The data processing system 400 can include a storage device 430 for accessing a storage medium 435, which may be removable, read-only, or read/write media and may be magnetic-based, optical-based, semiconductor-based media, or a combination of these. The data processing system 400 can also include one or more peripheral devices 440(1)-440(n) (collectively, devices 440), and one or more controllers and/or adapters for providing interface functions.

The system 400 can further include a communication interface 450, which allows software and data to be transferred, in the form of signals 454 over a channel 452, between the system 400 and external devices, networks, or information sources. The signals 454 can embody instructions for causing the system 400 to perform operations. The system 400 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 400 and/or delivered to the machine 400 over a communication interface. These instructions, when executed, enable the machine 400 to perform the features and functions described above. These instructions represent controllers of the machine 400 and can be implemented in a high-level procedural and/or object-oriented programming language, and/or in assembly/machine language. Such languages can be compiled and/or interpreted languages.

A number of implementations have been described. Nevertheless, it will be understood that various modifications may be made. For example, some implementations may omit one or more of the described operations, and system architectures other than those shown and described can be used. Accordingly, other implementations are within the scope of the following claims.

What is claimed is:

1. A computer-implemented method comprising:
receiving, by one or more computers, an identification of a web page;
extracting a set of keywords from the web page;
generating, from an automated keyword expansion of the set of keywords, a set of candidate keywords;
assigning one or more of the candidate keywords one or more confidence scores according to a ranking algorithm;
comparing the one or more confidence scores to a confidence threshold;
identifying, based on comparing, one or more candidate keywords that are associated with one or more confidence scores above the confidence threshold;
selecting, from the one or more candidate keywords that are associated with the one or more confidence scores above the confidence threshold, one or more keyword suggestions for the web page;
retrieving a performance threshold for the one or more keyword suggestions;
measuring, by the one or more computers, one or more performance values for the one or more keyword suggestions;
identifying a keyword suggestion associated with a performance value that is less than the performance threshold;
identifying a keyword suggestion associated with a performance value that is greater than the performance threshold;
performing the automated keyword expansion on the identified keyword suggestion associated with the performance value that is greater than the performance threshold;
generating, based on the performing, one or more alternate keyword suggestions;
replacing the identified keyword suggestion associated with the performance value that is less than the performance threshold with an alternate keyword suggestion;
measuring a performance value for the alternate keyword suggestion; and
comparing the measured performance value for the alternate keyword suggestion to the performance threshold.

2. The method of claim 1, wherein the identification of the web page comprises a unique address associated with the web page.

3. The method of claim 1, further comprising:
performing an automated evaluation of an advertising campaign associated with the web page that uses one or more of the one or more keyword suggestions,
wherein the one or more alternative keyword suggestions are at least partly based on the automated evaluation.

4. The computer-implemented method of claim 1 wherein the performance threshold relates to at least one of (i) a click rate associated with a paid listing campaign that comprises the one or more keyword suggestions, (ii) a conversion rate associated with the paid listing campaign, (iii) a ratio between the click rate and a cost for the paid listing campaign, or (iv) a ratio between the conversion rate and the cost for the paid listing campaign.

5. The method of claim 1, wherein the one or more keyword suggestions are associated with a paid listing campaign in accordance with a pay-per-click model.

6. The method of claim 1, wherein a confidence score is based on usage data comprising empirical click-rate data and cost-per-click data.

7. The method of claim 5, further comprising:
removing from the paid listing campaign, the identified keyword suggestion associated with the performance value that is less than the performance threshold.

8. An article comprising a machine-readable storage device configured to store instructions for causing a data processing apparatus to perform operations comprising:
receiving an identification of a web page;
extracting a set of keywords from the web page;
generating, from an automated keyword expansion of the set of keywords, a set of candidate keywords;
assigning one or more of the candidate keywords one or more confidence scores according to a ranking algorithm;
comparing the one or more confidence scores to a confidence threshold;
identifying, based on comparing, one or more candidate keywords that are associated with one or more confidence scores above the confidence threshold;
selecting, from the one or more candidate keywords that are associated with the one or more confidence scores above the confidence threshold, one or more keyword suggestions for the web page;
retrieving a performance threshold for the one or more keyword suggestions;
measuring one or more performance values for the one or more keyword suggestions;
identifying a keyword suggestion associated with a performance value that is less than the performance threshold;
identifying a keyword suggestion associated with a performance value that is greater than the performance threshold;
performing the automated keyword expansion on the identified keyword suggestion associated with the performance value that is greater than the performance threshold;
generating, based on the performing, one or more alternate keyword suggestions;
replacing the identified keyword suggestion associated with the performance value that is less than the performance threshold with an alternate keyword suggestion;
measuring a performance value for the alternate keyword suggestion; and
comparing the measured performance value for the alternate keyword suggestion to the performance threshold.

9. The article of claim 8, wherein the operations further comprise:
monitoring a performance of a campaign that uses at least one keyword from the one or more keyword suggestions; and
removing, from the campaign, the identified keyword suggestion associated with the performance value that is less than the performance threshold.

10. The article of claim 8, wherein a confidence score of a candidate keyword is based on at least one of a cost associated with the candidate keyword or click rate data.

11. One or more non-transitory machine-readable storage media configured to store instructions that are executable by one or more processing devices to perform functions comprising:
receiving an identification of a web page;
extracting a set of keywords from the web;
generating, from an automated keyword expansion of the set of keywords, a set of candidate keywords;
assigning one or more of the candidate keywords one or more confidence scores according to a ranking algorithm;

comparing the one or more confidence scores to a confidence threshold;

identifying, based on comparing, one or more candidate keywords that are associated with one or more confidence scores above the confidence threshold;

selecting, from the one or more candidate keywords that are associated with the one or more confidence scores above the confidence threshold, one or more keyword suggestions for the web page;

retrieving a performance threshold for the one or more keyword suggestions;

measuring one or more performance values for the one or more keyword suggestions;

identifying a keyword suggestion associated with a performance value that is less than the performance threshold;

identifying a keyword suggestion associated with a performance value that is greater than the performance threshold;

performing the automated keyword expansion on the identified keyword suggestion associated with the performance value that is greater than the performance threshold;

generating, based on the performing, one or more alternate keyword suggestions;

replacing the identified keyword suggestion associated with the performance value that is less than the performance threshold with an alternate keyword suggestion;

measuring a performance value for the alternate keyword suggestion; and comparing the measured performance value for the alternate keyword suggestion to the performance threshold.

12. The one or more machine-readable media of claim 11, wherein the identification of the web page comprises a unique address associated with the web page.

13. The one or more machine-readable media of claim 11, wherein the operations further comprise:

performing an automated evaluation of an advertising campaign associated with the web page that uses one or more of the one or more keyword suggestions, wherein the one or more alternative keyword suggestions are at least partly based on the automated evaluation.

14. The one or more machine-readable media of claim 11, wherein the performance threshold relates to at least one of (i) a click rate associated with a paid listing campaign that comprises the one or more keyword suggestions, (ii) a conversion rate associated with the paid listing campaign, (iii) a ratio between the click rate and a cost for the paid listing campaign, or (iv) a ratio between the conversion rate and the cost for the paid listing campaign.

15. The one or more machine-readable media of claim 11, wherein the one or more keyword suggestions are associated with a paid listing campaign in accordance with a pay-per-click model.

16. The one or more machine-readable media of claim 11, wherein a confidence score is based on usage data comprising empirical click-rate data and cost-per-click data.

17. The one or more machine-readable media of claim 15, wherein the operations further comprise:

removing, from the paid listing campaign, the identified keyword suggestion associated with the performance value that is less than the performance threshold.

18. The article of claim 8, wherein the performance threshold relates to at least one of (i) a click rate associated with a paid listing campaign that comprises the one or more first keyword suggestions, (ii) a conversion rate associated with the paid listing campaign, (iii) a ratio between the click rate and a cost for the paid listing campaign, or (iv) a ratio between the conversion rate and a cost for the paid listing campaign.

19. The article of claim 8, wherein the set of keywords is associated with a paid listing campaign in accordance with a pay-per-click model.

20. The article of claim 8, wherein a confidence score is based on usage data comprising empirical click-rate data and cost-per-click data.

* * * * *

UNITED STATES PATENT AND TRADEMARK OFFICE
CERTIFICATE OF CORRECTION

| | | |
|---|---|---|
| PATENT NO. | : 7,962,463 B2 | Page 1 of 1 |
| APPLICATION NO. | : 11/371209 | |
| DATED | : June 14, 2011 | |
| INVENTOR(S) | : Cava | |

It is certified that error appears in the above-identified patent and that said Letters Patent is hereby corrected as shown below:

Col. 9, line 54 in Claim 4, delete "1" and insert --1,--, therefor.

Col. 10, line 2 in Claim 7, delete "removing" and insert --removing,--, therefor.

Signed and Sealed this

Thirteenth Day of September, 2011

David J. Kappos
*Director of the United States Patent and Trademark Office*